United States Patent [19]

Beach et al.

[11] Patent Number: 5,042,142
[45] Date of Patent: Aug. 27, 1991

[54] WASHER-DISPENSING AND FASTENER-DRIVING MACHINE

[75] Inventors: John R. Beach, Elmhurst; Syed R. Hasan, Palatine; Donald W. Noren, Glenview; Craig A. Hindman; Ernest S. Santi, both of Palatine, all of Ill.

[73] Assignee: Illinois Tool Works Inc., Glenview, Ill.

[21] Appl. No.: 394,323

[22] Filed: Aug. 16, 1989

Related U.S. Application Data

[62] Division of Ser. No. 311,013, Feb. 15, 1989, Pat. No. 4,890,986.

[51] Int. Cl.$^5$ ............................................. B23P 21/00
[52] U.S. Cl. ....................................... 29/787; 29/813; 81/431; 227/43; 227/111; 227/120
[58] Field of Search ................. 29/771, 787, 809, 811, 29/813; 81/431, 435; 227/43, 111, 120

[56] References Cited

U.S. PATENT DOCUMENTS

| | | | |
|---|---|---|---|
| 3,734,377 | 5/1973 | Munn | 227/120 |
| 3,960,191 | 6/1976 | Murray | 81/57.37 |
| 4,236,555 | 12/1980 | Dewey | 81/431 |
| 4,246,939 | 1/1981 | Boegel | 81/431 X |
| 4,397,412 | 8/1983 | Dewey | 81/57.37 X |
| 4,657,167 | 4/1987 | Mays | 81/431 |
| 4,817,275 | 4/1989 | VanBerkel | 29/787 |

Primary Examiner—Timothy V. Eley
Assistant Examiner—Frances Chin
Attorney, Agent, or Firm—Schwartz & Weinrieb

[57] ABSTRACT

A machine for fastening one or more layers of roofing material to an underlayment, and a stackable washer therefor. A chute receives a stack of such washers. A shuttle displaces a single washer to a separated position when moved in one direction, to which the shuttle is biased, and releases the single washer when moved in the opposite direction. A gate, which cooperates with camming surfaces defined upon the respective washers, restrains the overlying washer within the stack against being displaced along with the single washer and restrains the single washer from being displaced from the separated position. Various components are provided by linking a stand-up screw gun of a known type to the shuttle. The stackable washer is embossed so that each such washer and like overlying and underlying washers within a stack contact each other at three or more places, which define tangent planes intersecting planes defined by planar areas upon such washers at angles greater than 45° but less than 90° whereby such washers are spaced from each other around their entire peripheries. Notches defined within the washers cooperate with ribs provided within the chute so as to ensure that a stack of the washers is oriented properly when disposed within the chute.

15 Claims, 5 Drawing Sheets

WASHER-DISPENSING AND FASTENER-DRIVING MACHINE

This is a division of application Ser. No. 311,013, filed Feb. 15, 1989, U.S. Pat. No. 4890986.

TECHNICAL FIELD OF THE INVENTION

This invention pertains to an improved machine for fastening one or more layers of roofing material, such as, for example, a blanket of roofing insulation or a roofing membrane, to an underlayment, such as, for example, a wooden roof or a corrugated metal roof. The machine dispenses roofing washers individually onto such material and drives a fastener having a head, such as, for example, a screw, through a central aperture of each washer, through such material, and into the underlayment, until the fastener bears against the washer. This invention also pertains to an improved, stackable washer, preferably embossed, which is dispensable by means of such a machine.

BACKGROUND OF THE INVENTION

Various portable or semi-portable machines are known which dispense roofing washers individually onto roofing material, such as, for example, a blanket of roofing insulation or a roofing membrane, and which drive a fastener having a head, such as, for example, a screw, through the central aperture of such a washer, through the roofing material, and into a underlayment, such as, for example, a wooden roof or a corrugated metal roof, until the fastener bears against the washer. Herein, terms such as "roof" and "roofing" are to be broadly understood, so as to cover roofs, decks, ceilings, and similar structures.

Such a portable or semi-portable machine is exemplified in Boegel U.S. Pat. No. 4,246,939 wherein different mechanisms are disclosed (see FIGS. 19, 20, and 21, and FIG. 22) for dispensing washers individually from a stack of washers disposed within a magazine. In such a portable or semi-portable machine, it is known to place a weighted plunger onto the uppermost washer within the stack so as to restrain the washers within the stack from cascading from the stack if the magazine is tipped so as to tip the stack.

Another such machine is exemplified in Mays U.S. Pat. No. 4,657,167 wherein different mechanisms are disclosed (see FIGS. 3, 4, and 5 and FIGS. 6 through 10) for dispensing washers (which are called washer-like plates or disks) from a stack of washers within a magazine. No provision is disclosed to restrain the washers within the stack from cascading from the stack when the magazine is tipped whereby the stack is likewise tipped. Tipping is required (see column 4, lines 31 through 36) so as to allow laterally mounted wheels of the disclosed machine to roll upon an underlying surface.

Roofing washers of particular interest are disclosed in Dewey U.S. Pat. Des. No. 263,678, Dewey U.S. Pat. Des. No. 263,927, and Dewey U.S. Pat. Des. No. 263,928 which are assigned to Illinois Tool Works Inc. of Chicago, Ill., the assignee hereof. Each such washer has a central aperture, which is adapted to receive a fastener, and is embossed with a pattern of ribs so as to have positive relief and planar areas upon its upper face and negative relief and planar areas upon its lower face. The ribs upon such washers are functional, as well as ornamental, since the ribs strengthen and rigidify such washers, which can thus be made from thin blanks.

Ordinarily, when stackable washers, such as, for example, those according to any of the Dewey patents noted above, are made within a mechanical or hydraulic press employing metal-working dies, a lubricating medium is used which tends to leave some residue upon each washer. It is uneconomical to clean such residue from each washer. Because such residue tends to be somewhat adherent, and because such washers tend to be tightly stacked, it is difficult to dispense such washers individually from a washer-dispensing machine, since a plurality of such washers tend to be simultaneously displaced from a stack of such washers within such a machine, whereby the machine can become jammed.

Although the washers noted above are typically square, except for rounded corners, circular roofing washers and oblong roofing washers are also known. Circular roofing washers have particular utility in connection with roofing membranes, which tend to be easily punctured.

Washers with countersunk apertures are preferred for overlying more compressible material, such as, for example, a blanket of roofing insulation, whereas washers without countersunk apertures are preferred for overlying less compressible material, such as, for example, a roofing membrane, which would be typically applied over a blanket of roofing insulation. It is desirable to countersink the heads of fasteners used to fasten a blanket of roofing insulation to an underlayment, if a roofing membrane is to be later applied over the blanket of roofing insulation, in an effort to avoid puncturing the roofing membrane where the fastener heads would underlie the roofing membrane and where a worker might step carelessly or unwittingly.

Stackable washers according to Dewey U.S. Pat. Des. No. 268,678, as produced from steel blanks and embossed to countersink their central apertures relative to positive relief upon their upper faces and negative relief upon their lower faces, and as sold by ITW-Buildex (a division of Illinois Tool Works Inc.) of Itasca, Ill., have enjoyed commercial success in the United States in recent years.

Also of particular interest are screw guns equipped with screw-feeding attachments, that is, so-called stand-up screw guns, and they are exemplified in Murray U.S. Pat. No. 3,960,191, Dewey U.S. Pat. No. 4,236,555, and Dewey U.S. Pat. No. 4,397,412, which are assigned to Illinois Tool Works Inc., the assignee hereof. Such stand-up screw guns, as known heretofore, are not capable of dispensing washers but are used to drive screws through central apertures of manually placed washers, through roofing materials, and into underlayments. Such stand-up screw guns, as sold by ITW-Buildex (a division of Illinois Tool Works Inc.) of Itasca, Ill., under its ACCUDRIVE XL trademark, have enjoyed commercial success in the United States in recent years.

Although known portable or semi-portable machines in which dispense roofing washers individually onto roofing material, such as, for example, a blanket of roofing insulation or a roofing membrane, and which drive a fastener having a head, such as, for example, a screw, through a central aperture of each washer, through the roofing material, and into an underlayment, such as, for example, a wooden roof or a corrugated metal roof, until the fastener bears against such washer, have proved to be generally satisfactory, there has been a need for an improved machine having such capabilities.

Moreover, there has been a need for an improved stackable washer, which is dispensable by means of such a machine.

SUMMARY OF THE INVENTION

This invention provides an improved machine for use with stackable roofing washers having central apertures and for fastening one or more layers of roofing material, such as, for example, a blanket of roofing insulation or a roofing membrane, to an underlayment, such as, for example, a wooden roof or a corrugated metal roof, by means of fasteners having heads, such as, for example, screws, with such a washer being interposed between the head of each fastener and such material. The machine dispenses such washers individually onto such material, at spaced locations, and drives such a fastener through a central aperture of each washer, through such material, and into the underlayment, until the fastener bears against such washer.

The washer-dispensing and fastener-driving machine provided by means of this invention has a base supporting a chute adapted to receive a stack of such washers to be individually dispensed by means of such machine. A shuttle is mounted to the base for horizontal movement between a normal position and a displaced position. The shuttle is adapted to engage a single washer from the stack when the shuttle is in the displaced position, to displace the single washer from the stack to a separated position by means of positive engagement of the shuttle with the single washer as the shuttle is moved from the displaced position to the normal position, and to release the single washer at the separated position as the shuttle next moves from the normal position to the displaced position.

The machine further comprises washer-restraining means for restraining the washer overlying the single washer within the stack against being displaced from the stack along with the single washer as the shuttle moves from the displaced position to the normal position and for restraining the single washer from being displaced from the separated position as the shuttle moves from the normal position to the displaced position after having displaced the single washer from the stack to the separated position.

Preferably, if such washers are embossed so as to form camming surfaces in suitable patterns upon one broad face of each such washer, and if such washers are stacked so that the broad face formed with the camming surfaces upon each such washer is its upper face, such means may comprise a gate, which is mounted upon the base for movement toward and away from a lowermost position. The gate, which is biased toward, the lowermost position, provides sufficient clearance for all or substantially all of a single washer being displaced by means of the shuttle from the stack to the separated position so as to pass beneath the gate but insufficient clearance for any overlying washer within the stack to also pass beneath the gate along with the single washer. The gate, which is cammed upwardly by means of camming surfaces formed upon the upper face of the single washer as the single washer is displaced by means of the shuttle, so as to allow the single washer to pass beneath the gate, engages the camming surfaces upon the upper face of the single washer so as to restrain the single washer against being displaced from separated position as the shuttle next moves from the normal position to the displaced position.

Preferably, for use with stackable roofing washers embossed so as to form camming surfaces in such a pattern upon one broad face of each such washer, stacked so that the broad face formed with the camming surfaces upon each such washer is its upper face, and provided at the periphery of each such washer with at least one such notch, and preferably with two such notches at spaced locations upon its periphery, as exemplified by means of an improved washer described below as provided by means of this invention, the chute is provided with a rib corresponding to each such notch, the rib or ribs being disposable within the notch or notches of each such washer and of the similar overlying and underlying washers within a stack received by means of the chute so as to restrain such washers against cascading from the stack when the chute is tipped whereby the stack is likewise tipped. There is no need for a weighted plunger to restrain such washers against cascading from the stack.

Moreover, the washer-dispensing and fastener-driving machine provided by means of this invention comprises shuttle-biasing means for biasing the shuttle to the normal position but permitting the shuttle to be forcibly moved from the normal position to the displaced position and shuttle-moving means arranged to be operator-actuated and to be normally deactuated for moving the shuttle forcibly from the normal position to the displaced position when actuated and for moving the shuttle as biased by means of the shuttle-biasing means from the displaced position to the normal position when deactuated, along with fastener-driving means adapted to be operator-actuated for driving a fastener through the central aperture of the single washer while the single washer is disposed at the separated position and the shuttle is disposed at the displaced position.

The shuttle-biasing, shuttle-moving, and fastener-driving means may be advantageously provided by linking a stand-upon screw gun of a type exemplified in Murray U.S. Pat. No. 3,960,191, Dewey U.S. Pat. No. 4,236,555, and Dewey U.S. Pat. No. 4,397,412 to the shuttle, by means of a mechanical linkage. The base, the chute, and the shuttle, as combined with such linkage, may thus be regarded as an attachment for such a screw gun, which can be independently used without a washer-dispensing capability.

This invention also provides an improved, stackable, roofing washer for use with roofing material, such as, for example, a blanket of roofing insulation or a roofing membrane. The washer is individually machine-dispensable, as by means of the washer-dispensing and fastener-driving machine described above as provided by means of this invention.

Each washer provided by means of this invention is similar to known washers described above in having a periphery, in having a central aperture adapted to receive a fastener, such as, for example, a screw, and in being embossed with a pattern of ribs, which rigidify the washer and are spaced outwardly from the central aperture, so as to have positive relief and planar areas upon a given one of its broad faces, and so as to have negative relief and planar areas upon the other one of its broad faces. Moreover, when a stack of such washers is made for use within the washer-dispensing and fastener-driving machine described above as provided by means of this invention, such relief forms camming surfaces upon the given one of the broad faces of each such washer for the purposes described above.

Each washer may be advantageously made from a steel blank, which may be so embossed within a mechanical or hydraulic press employing matched dies and a lubricating medium, and which may be previously or subsequently galvanized. As embossed, such washer is nestable with like overlying and underlying washers within a stack such that positive relief upon such washer nests into negative relief upon an overlying washer within the stack, and such that positive relief upon an underlying washer within the stack nests into negative relief upon such washer.

Each washer provided by means of this invention is distinguishable from known washers described above in being embossed such that such washer and like overlying and underlying washers within a stack contact each other at three or more places, which are defined by means of ribs upon such washer and ribs upon like underlying and overlying washers within the stack, and which define tangent planes intersecting planes defined by means of planar areas upon each of the broad faces of such washer at angles of more than 45° but less than 90°, and preferably approximately 60°. These places, which are located where the positive relief nests into the negative relief, are spaced from the central aperture of such washer and from the peripheries of such washer and of like washers within the stack. Consequently, such washer and like overlying and underlying washers within the stack are spaced from each other around their entire peripheries, so as to facilitate their individually machine-dispensability with little tendency to adhere to each other even if coated partly or wholly with residue of a lubricating medium.

If tangent planes, as defined by means of the ribs where each washer provided by means of this invention and like overlying and underlying washers within a stack contact each other, were to intersect planes defined by means of planar areas upon each of the broad faces of the washer at angles of 45° or less, such washer and like overlying and underlying washers within the stack could be tightly stacked, rather than spaced from each other around their entire peripheries. Angles less than 90° are required for nesting. As mentioned above, angles of approximately 60° are preferred.

Theoretically, two stacked washers can contact each other at three places only. Practically, however, two stacked washers can appear to contact each other at more than three places. This invention does not distinguish between actual contact, in a theoretical sense, and apparent contact, in a practical sense.

In some forms that have been envisioned, each washer provided by means of this invention is embossed with radial ribs, preferably with at least three ribs, the rib or ribs defining positive relief upon the given one of its broad faces, defining negative relief upon the other one of its broad faces, and defining such places where the washer and like overlying and underlying washers within a stack contact each other. The ribs of such washer may be advantageously disposed at regularly spaced intervals around its central aperture.

Preferably, such washer is embossed with four such ribs, which extend in radial directions relative to the central aperture. The broad faces of such washer may be substantially square with four such ribs extending diagonally along the broad faces. Desirably, if such washer is used to overlie more compressible material, such as, for example, a blanket of roofing insulation, rather than less compressible material such as, for example, a roofing membrane, such washer may also be embossed so as to countersink its central aperture relative to the positive relief upon the given one of its broad faces and to the negative relief upon the other one of its broad faces. Such washer may be further embossed, as for ornamental purposes or for strengthening and rigidifying purposes, so long as any further embossing does not cause such washer and like overlying and underlying washers within a stack to no longer be separated around their entire peripheries.

Each washer provided by means of this invention may also be formed with at least one notch at its periphery, preferably with two notches at spaced locations upon its periphery, the notch or notches adapting such washer to fit into a washer-receiving chute of a washer-dispensing machine, such as, for example, the washer-dispensing and fastener-driving machine noted above, in which the chute is provided with a rib corresponding to each notch, the rib or ribs being disposable within the notch or notches so as to restrain such washer and like overlying and underlying washers within a stack from cascading from the stack when the chute is tipped whereby the stack is likewise tipped.

Preferably, if such washer is embossed so as to have positive relief upon one broad face and negative relief upon its other face, so as to have a countersunk portion, which includes its central aperture, or so as to achieve both purposes, the notch or notches are located so as to perform another function, namely to insure that the broad face having positive relief is the upper face when such washer is disposed within the chute with the rib or ribs fitting into the notch or notches of such washer. The rib or ribs prevents or prevent such washer from being rotated when being fitted into the chute and from being inverted when being fitted into the chute.

A stack of such washers, each having a notch or spaced notches for the purposes described above, may be advantageously packaged within a container, which is disposable along with the stack into such a washer-receiving chute having a rib or spaced ribs disposable within the notch or notches for such purposes, and which has side walls covering the peripheries of such washers within the stack, except for a slot or spaced slots exposing the notches and allowing the rib or ribs to fit through the slot or slots and into the notch or notches so as to restrain such washers within the stack against cascading from the stack when the chute is tipped whereby the stack is likewise tipped.

BRIEF DESCRIPTION OF THE DRAWINGS

These and other objects, features, and advantages of this invention will become evident from the following description of a preferred embodiment of the machine provided by means of this invention and by means of the following description of a preferred embodiment of the washer provided by means of this invention, with reference to the accompanying drawings, in which like reference characters designate like or corresponding parts throughout the several views, and wherein:

FIG. 1 also shows, fragmentarily, a sheet of roofing material fastened to an underlayment at one location by means of a screw having a head and an integral washer and with a roofing washer being used.

FIG. 5 is taken along a plane including line 5—5 of FIG. 3 in a direction indicated by means of the arrows.

FIG. 6 shows a shuttle in a normal position. FIG. 7 shows the shuttle in a displaced position. FIG. 6 also shows, in phantom lines, a screw being fed into the machine.

FIGS. 9 and 10 also show a stack of roofing washers being handled by means of the machine.

FIG. 11 shows the gate coacting with camming surfaces of a roofing washer so as being displaced by means of the shuttle. FIG. 12 shows the gate coating with camming surfaces of a roofing washer to restrain the roofing washer from returning with the shuttle.

FIG. 14 also shows a roofing washer dispensable by means of the machine.

FIG. 15 shows a screw-feeding tube in an installed position in full lines and in a removed position in phantom lines.

FIG. 19 shows the washer-filled container being inserted manually into a chute of the machine after the removable lower cover has been removed. The removable lower cover is not shown in FIG. 19.

FIGS. 22 and 23 show, fragmentarily, several such washers within a stack.

DETAILED DESCRIPTION OF THE PREFERRED EMBODIMENTS

As shown in FIGS. 1 through 17, a washer-dispensing and fastener-driving machine 10, which constitutes a preferred embodiment of the washer-dispensing and fastener-driving machine provided by means of this invention, is used to fasten a sheet 12 of roofing material, such as, for example, a blanket of roofing insulation, to an underlayment 14, such as, for example, a wooden roof, by means of screws 16 of a known type having hexagonal heads and integral washers and with a roofing washer 18 interposed between the head and integral washer of each screw 16 and the sheet 12. Suitable screws having hexagonal heads and integral washers are available commercially from ITW Buildex (a division of Illinois Tool Works Inc.) of Itasca, Ill., under its HEXCEL trademark. The machine 10 dispenses such washers 18 individually onto the sheet 12, at spaced locations, and drives such a screw 16 through a central aperture 20 of each roofing washer 18, through the sheet 14, and into the underlayment 14, until the head and integral washer of the screw 16 bear against the roofing washer 18. The machine 10 is equipped with a roller 22, which enables the machine 10 to be manually moved to another location.

Figures 1, 2, 3, 4:
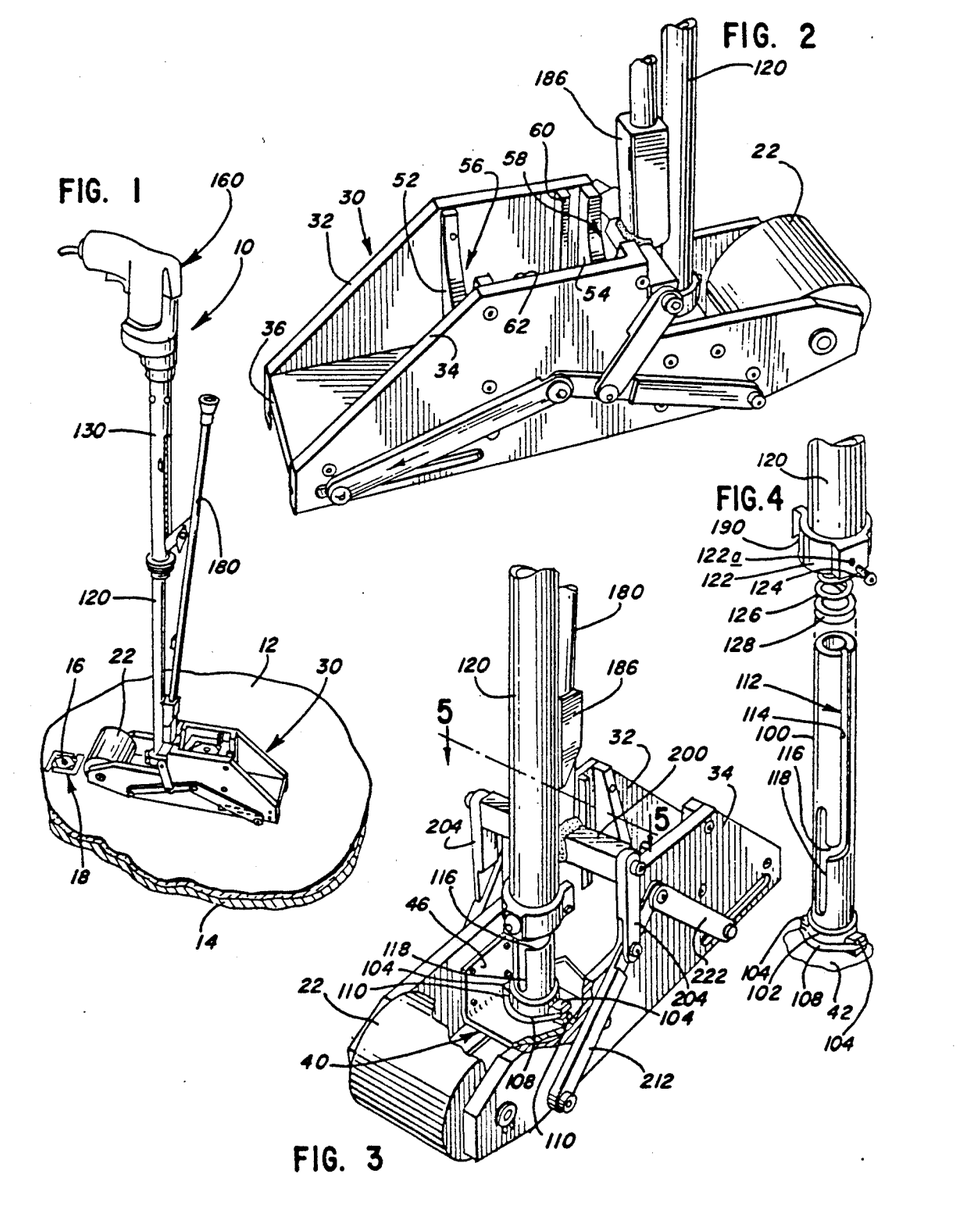
FIG. 1 is a perspective view of a preferred embodiment of the washer-dispensing an fastener-driving machine provided by means of this invention.
FIGS. 2 and 3 respectively are enlarged, fragmentary, perspective views taken from different directions so as to show lower portions of the machine shown in FIG. 1. Certain components are shown in different positions in FIGS. 2 and 3.
FIG. 4 is a fragmentary exploded view of certain components of the machine as shown in FIG. 3.
Figure 5:
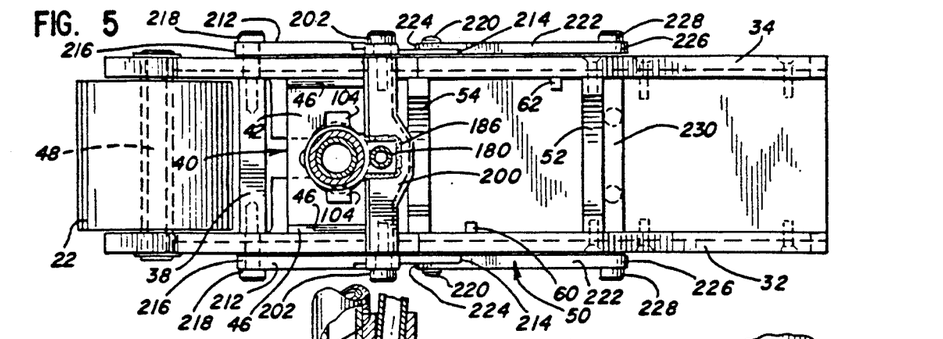
FIG. 5 is a partly sectional, top plan view of the lower portions of the machine as shown in FIG. 3 with certain components removed so as to allow other components to be better shown. Where sectioned.

The machine 10 comprises a base 30 with a front portion, as shown at its lower right in FIG. 1, a rear portion, as shown at its upper left in FIG. 1, and intermediate portions between its front and rear portions. The machine 10 is assembled, with machine screws of a conventional type having enlarged heads with hexagonal sockets, as shown, from various components, namely opposite, upright, side plates 32, 34, a shelf 36, which is mounted between the plates 32, 34, at the front portion of the base 30, a brace 38, which is mounted between the plates 32, 34, at the rear portion of the base 30, and a U-shaped bracket 40, which is mounted between the plates 32, 34, at an intermediate portion of the base 30. The bracket 40 has a bight 42, which has a central aperture 44, and opposite, upright, end portions 46, each of which is mounted to a respective one of the side plates 32, 34.

The roller 22 is mounted for free rotation upon an axle 48, which is supported at is ends by means of the plates 32, 34 respectively. Rather than a solid roller as shown, a spool-like roller (not shown) having two wheel-like portions or separate wheels (not shown) may be used instead.

The machine 10 comprises a washer-receiving chute 50, as noted in FIG. 19, which is adapted to receive a stack S of such washers 18, each washer 18 being spaced from each other within the stack S around their entire peripheries in a manner to be later described. The chute 50 is defined by means of a front wall 52, a rear wall 54, and side walls constituted by means of portions of the side plates 32, 34, defined between the walls 52, 54. The walls 52, 54, are mounted between the side plates 32, 34, at an intermediate portion of the base 30, between the shelf 36 and the bracket 40. The front wall 52 has a larger, V-shaped cutout 56, which facilitates loading the chute 50 with the stack S of such washers 18. The rear wall 54 has a smaller, V-shaped cutout 58, which provides clearance for a crosspiece to be later described.

The plate 32 is provided with a vertical rib 60, which is spaced by means of a given distance (see FIG. 5) from the front wall 52, where a portion of the side plate 32 defines a side wall of the chute 50. The plate 34 is provided with a vertical rib 62, which is spaced by means of a greater distance (see FIG. 5) from the rear wall 54, where a portion of the side plate 34 defines a side wall of the chute 50. The ribs 60, 62, which may be advantageously provided by means of machined inserts (not shown) within machined grooves (not shown) defined within the side plates 32, 34, fit into and cooperate with notches 64, 66, defined within the lateral edges of each roofing washer 18 disposed within the stack S in a manner to be later described, so as to thereby restrain the roofing washers 18 within the stack S against cascading from the stack S if the machine 10 including the chute 50 is tipped which in turn tips the stack S. The ribs 60, 62, cause the chute 50 to be asymmetrically shaped for a purpose to be later described.

Figures 6, 8:
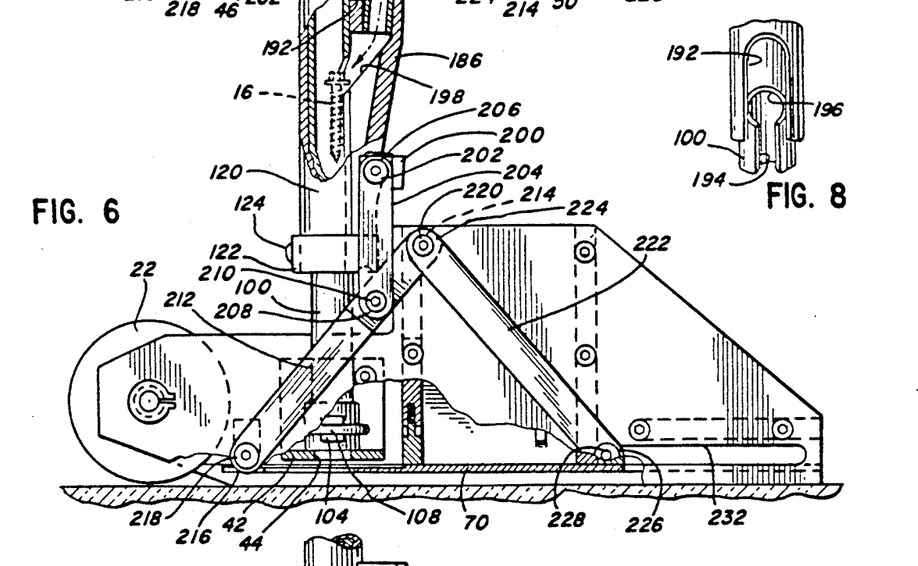
FIGS. 6 and 7 are partly fragmentary, elevational views, as taken from one side of the lower portions of the machine as shown in FIG. 3.
FIG. 8 is a slightly enlarged, quarter-turn rotated, fragmentary, perspective, detail view of a screw-receiving tube shown fragmentarily in FIG. 6.
Figure 7:
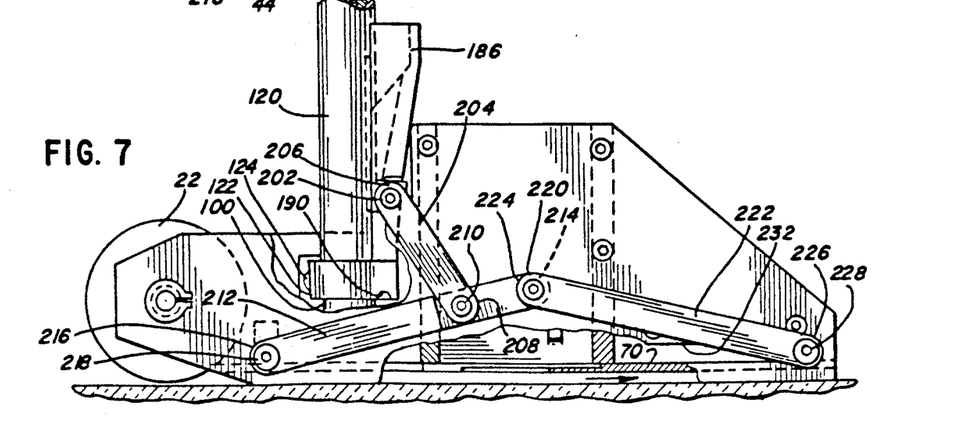
Figure 9:
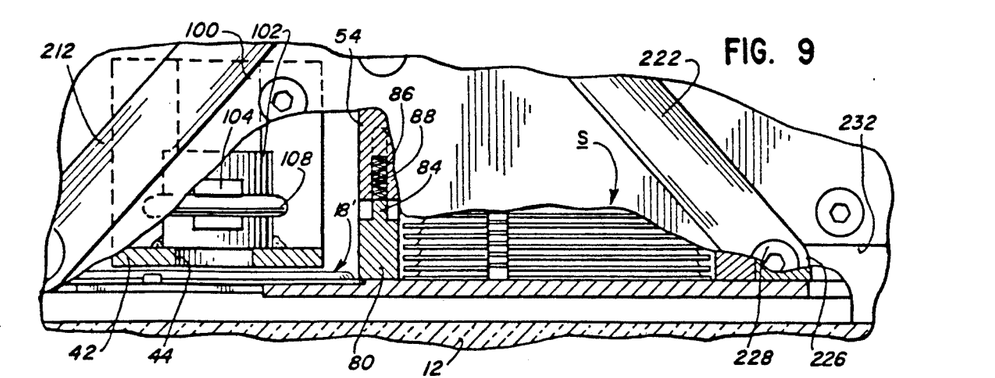
FIGS. 9 and 10 are enlarged, fragmentary detail views of certain components of the machine as shown in FIGS. 6 and 7 respectively.
Figure 10:
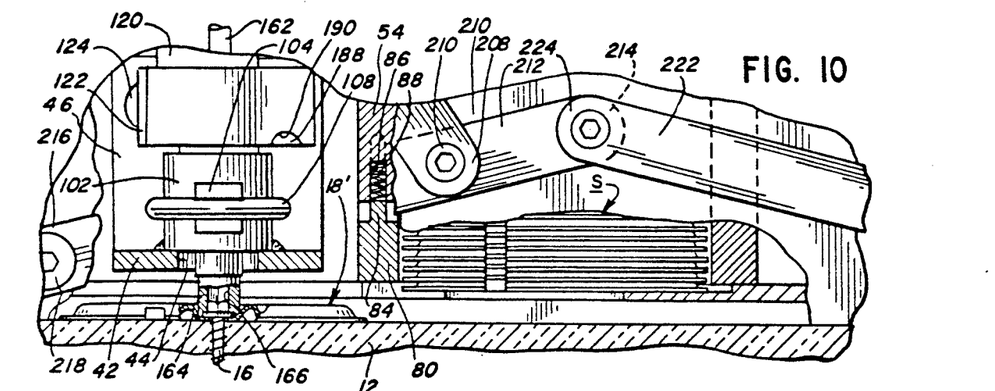
Figure 11:
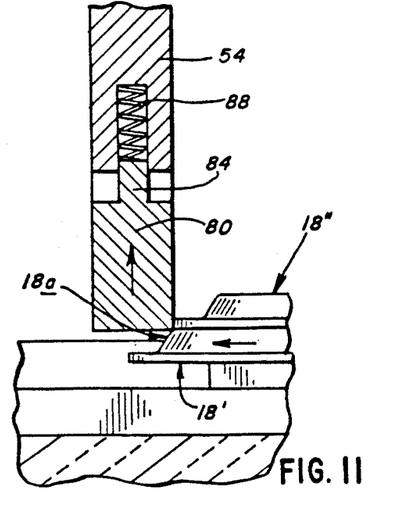
FIGS. 11 and 12 are further enlarged, fragmentary detail views of a gate and a shuttle of the machine as shown in FIGS. 6, 7, 9, and 10.
Figure 12:
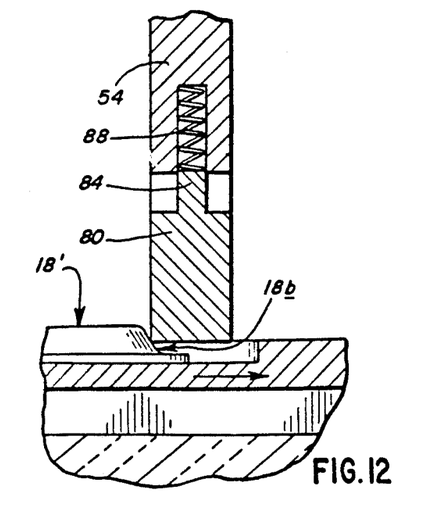

The machine 10 comprises a shuttle 70, which is mounted upon the base 30 for horizontal movement between a normal position, at which the shuttle 70 is shown in FIGS. 6 and 9, and a displaced position, in which the shuttle 70 is shown at FIGS. 7 and 10. The shuttle 70 is biased toward the normal position in manner to be later described. The shuttle 70 has opposite, parallel, side edges 72, each of which fits slidably into a longitudinal groove 74 (see FIG. 13) defined within a respective one of the side plates 32, 34. A rear portion of the shuttle 70 is recessed (see FIG. 14) so as to adapt the shuttle 70 in order to engage a single washer 18' from the stack S (see FIG. 10) when the shuttle 70 is at the displaced position, the single washer 18' being the lowermost washer within the stack S, and to displace the single washer 18' from the stack S to a separated position (see FIG. 9) by means of positive engagement of a front edge 76 of the recessed rear portion of the shuttle 70 with a trailing edge of the single washer 18' as the shuttle 70 moves from the displaced position to the normal position. The shuttle 70 has a rearwardly opening, U-shaped cutout 78, defined within its recessed rear portion, so as to accommodate a countersunk portion of the single washer 18'. The shuttle 70 is thus adapted to release the single washer 18' at the separated position as the shuttle 70 next moves from the normal position to the displaced position.

The machine 10 comprises a gate 80, which restrains the overlying washer 18" within the stack S against being displaced from the stack S along with the single washer 18' as the shuttle 70 moves from the displaced position to the normal position, and which restrains the single washer 18' from being displaced from the separated position as the shuttle 70 moves from the normal position to the displaced position after having displaced the single washer 18' from the stack S to the separated position. The gate 80 is mounted upon the base 30, within an inverted, V-shaped cutout 82 defined within the rear wall 54 of the chute 50, for vertical movement through a limited range toward and away from a lowermost position, at which the gate 80 is shown in FIG. 9. The gate 80 has upwardly facing portions conforming to the cutout 82, as shown, so as to center the gate 80 when the gate 80 is moved to an uppermost position, at which the gate 80 engages upper edges of the cutout 82. An upstanding tongue 84, which is an integral extension of the gate 80, fits slidably within a downwardly opening groove 86 defined within the rear wall 54 of the chute 50. The gate 80 is biased downwardly, toward the lowermost position, by means of a pair of coiled springs 88, which are seated within upwardly opening notches 90 defined within the tongue 84, and which bear against an upper edge of the groove 86.

At the lowermost position, the gate 80 bears at its lower edge against the shuttle 70, either at opposite edges of the shuttle 70 so as to span the recessed rear portion of the shuttle 70, when the shuttle 70 is disposed at the displaced position, or across the shuttle 70, when the shuttle 70 is disposed at the normal position. In the lowermost position, the gate 80 provides sufficient clearance for the single washer 18' being displaced by means of the shuttle 70 from the stack S to the separated position so as to pass beneath the gate 80 but insufficient clearance for the overlying washer 18" within the stack S to also pass beneath the gate 80. The gate 80 is cammed upwardly by means of camming surfaces 18a with which the single washer 18' is embossed upon its upper face and near its leading edge (see FIG. 11) as the single washer 18' is displaced by means of the shuttle 70, so as to allow the single washer 18' to pass beneath the gate 80. When cammed upwardly, the gate 80 engages the leading edge of the overlying washers 18 within the stack S (see FIG. 11) so as to restrain the overlying washers 18 against being displaced along with the single washer 18'. After the single washer 18' has passed beneath the gate 80 except for a marginal portion including the trailing edge of the washer 18', the single washer 18' is considered to have been moved to the separated position, and the gate 80 engages camming surfaces 18b with which the single washer 18 is embossed upon its upper face and near its trailing edge (see FIG. 12) so as to restrain the single washer 18' against being displaced from the separated position as the shuttle 70 next moves from the normal position to the displaced position.

Moreover, the machine 10 comprises shuttle-biasing means, shuttle-moving means, and fastener-driving means. The shuttle-biasing means biases the shuttle 70 to the normal position but permits the shuttle 70 to be forcibly moved (against such bias) from the normal position to the displaced position. The shuttle-moving means, which is arranged to be operator-actuated and to be normally deactuated, moves the shuttle 70 forcibly (against such bias) from the normal position to the displaced position when actuated and moves the shuttle 70 as biased by means of the shuttle-biasing means from the displaced position to the normal position when deactuated. The fastener-driving means is used to drive a screw 16 through the central aperture of the single washer 18' while the single washer 18' is at the separated position and the shuttle 70 is at the displaced position.

The shuttle-biasing, shuttle-moving, and fastener-driving means are provided by linking a stand-up screw gun of a type exemplified in Murray U.S. Pat. No. 3,960,191, Dewey U.S. Pat. No. 4,236,555, and Dewey U.S. Pat. No. 4,297,412 to the shuttle 70, by means of a mechanical linkage, as described blow. The disclosures of Murray U.S. Pat. No. 3,960,191, Dewey U.S. Pat. No. 4,236,555, and Dewey U.S. Pat. No. 4,397,412 are incorporated herein by reference.

Thus, a tubular nosepiece 100, as seen in FIG. 4, is welded to the bight 42 of the bracket 40 so as to extend upwardly, and so as to communicate with the central aperture 44 defined within the bight 42, and is provided at is lower end with an integral collar 102 and with a pair of jaws 104, which extend radially into diamatrically opposed apertures 106 defined within the integral collar 102, and which are biased inwardly in a radial sense by means of an elastomeric 0-ring 108 disposed around the integral collar 102 and removably seated within suitable grooves 110 defined within the respective jaws 104. Similar jaws biased by means of such an 0-ring are disclosed in Dewey U.S. Pat. No. 4,236,555. The jaws 104, which are adapted to be outwardly cammed in a manner to be later described, position a screw 16 in axial alignment with a driving bit to be later described, prevent the screw 16 from dropping through the nosepiece 100 before the screw 16 is driven by means of the driving bit, but permit the screw 16 to be ejected downwardly as the screw 16 is driven.

As shown in FIG. 4, the nosepiece 100 is provided externally with a J-shaped groove 112, which has a longer, vertical portion 114 leading to the upper end of the nosepiece 100, a curved, transitional portion 116, and a shorter, vertical portion 118. The curved, transitional portion 116 leads to the lower end of the longer, vertical portion 114 and to a midsection of the shorter, vertical portion 118.

As shown in FIGS. 3 and 4 and elsewhere, a tubular element 120 is telescoped over the tubular nosepiece 100. A horseshoe-shaped bracket 122, which partly surrounds the tubular element 120, is welded to the tubular element 120. The bracket 122 receives a machine screw 124 having a threaded shank 124a which passes through an aperture 122a, defined within the bracket 122, and through an axially aligned, threaded aperture (not shown) defined within a lower end portion of the tubular element 120, and which extends into the groove 112 when the tubular element 120 is telescoped over the tubular nosepiece 100. When the tubular element 120 and the tubular nosepiece 100 are assembled, the threaded shank 124a of the machine screw 124 is manipulated down the longer vertical portion 114, through the curved transitional portion 116, and into the shorter vertical portion 118, which allows a limited range of vertical movement of the tubular element 120 relative to the tubular nosepiece 100. A coiled spring 126 is disposed within the tubular element 120 so as to bear at its lower end, by means of an annular washer 128 fixed to the lower end of the coiled spring 126, against the upper end of the tubular nosepiece 100, and so as to bear at its upper end against an annular stop (not shown) provided within the tubular element 120, so as to thereby bias the tubular element 120 upwardly within the limited range of vertical movement of the tubular element 120 relative to the tubular nosepiece 100. The threaded shank 124a of the machine screw 124 engages the annular washer 128 at the lower end of the coiled spring 126 so as to restrain the coiled spring 126 against being ejected from the tubular element 120 when the tubular element 120 and the tubular nosepiece 100 are disassembled.

Figures 13, 14, 15, 16, 17:
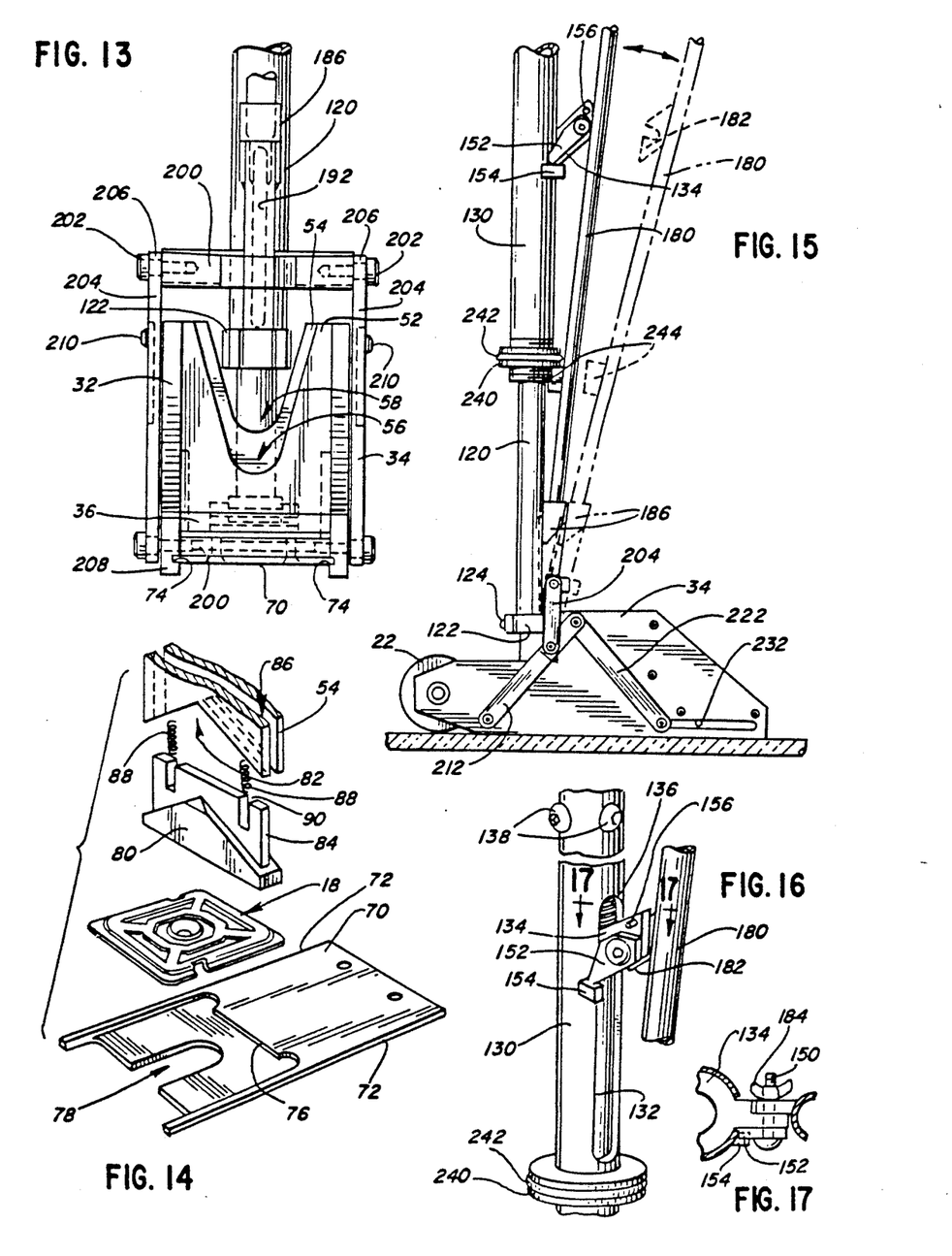
FIG. 13 is a front elevational view of the machine as shown in FIG. 3.
FIG. 14 is a slightly enlarged, partly fragmentary, exploded, perspective detail view of certain components of the machine, namely a shuttle and a gate.
FIG. 15 is a slightly reduced, partly fragmentary, elevational view, as taken from the same side of the machine as that of FIG. 6.
FIG. 16 is a somewhat enlarged, slightly rotated, fragmentary detail view of certain elements shown in FIG. 15.
FIG. 17 is a fragmentary, sectional view, as taken along line 17—17 of FIG. 16 in a direction indicated by means of the arrows.

As shown in FIGS. 1 and 15, a tubular element 130 is telescoped over the tubular element 120. The tubular element 130 is provided with a wide vertical slot 132. A fitment 134, which is attached by means of machine screws to an upper end portion of the tubular element 120, extends outwardly through the slot 132, which provides a limited range of vertical movement of the tubular element 130 relative to the tubular element 120. A coiled spring 136 is disposed within the tubular element 130 so as to bear at its lower end against the tubular element 120, and so as to bear at its upper end against an annular stop (not shown) which is mounted within the tubular element 130 by means of machine screws 138 mounted within threaded apertures (not shown) defined within the tubular element 130, so as to thereby bias the tubular element 130 upwardly within the limited range of vertical movement of the tubular element 130 relative to the tubular element 120.

A bolt 150, which is threaded through the fitment 134, serves as a pivot for a latching element 152, which can be selectively pivoted between an operative position (see FIGS. 16 and 17) wherein the latching element 152 engages a fixed stop 154 welded to the tubular element 130, so as to prevent upward movement of the tubular element 130 relative to the tubular element 120, and an inoperative position (see FIG. 15) wherein such movement is permitted by means of the disengagement of the latching element 152. A pintle 156, which extends laterally from the fitment 134, limits pivotal movement of the latching element 152.

A trigger-actuatable, electrically powered screw gun 160 is mounted in a known manner upon the upper end of the tubular element 130. The screw gun 160 comprises an elongate, rod-like driver 162 carrying a driving bit 164, which can be removably attached to the driver 162 (see FIG. 10) at its lower end. The driving bit 164 has a downwardly opening, hexagonal socket 166, which is adapted to drive a screw 16 (see FIG. 10) fed in a manner to be next described, when the screw gun 160 is actuated with the socket 166 engaged with the head of the screw 16. The socket 166 can be so engaged only when the tubular element 130 has been moved forcibly downwardly along the tubular element 120 and the tubular element 120 has been moved forcibly downwardly along the tubular nosepiece 100. The driving bit 164 is adapted to cam the jaws 104 outwardly when moved downwardly with the tubular elements 120, 130. The coiled springs 126, 136, are selected to have spring characteristics enabling the tubular element 120 to be so moved only after the tubular element 130 has been so moved so as to cause the coiled spring 126 to be fully compensated, or nearly so.

A screw-feeding tube 180 is removably mounted upon the tubular element 120. A fitment 182, which is welded to the tube 180, can be removably mounted upon the fitment 134 (which, as described above, is attached to an upper end portion of the tubular element 120) by means of the bolt 150, which receives a wing nut 184, as shown in FIGS. 15, 16, and 17. A screw-deflecting slide 186, which is rigidly mounted upon the lower end of the tube 180, has a pair of ears 188, which fit into downwardly opening recesses 190 defined within distal ends of the horseshoe-shaped bracket 122 (see FIG. 7) when the fitment 182 is mounted upon the fitment 134, so as to mount the tube 180 upon the tubular element 120. Where the tubular element 120 confronts the slide 186, the tubular element 120 is provided with a wide, vertical slot 192 (see FIG. 6 and 8) providing sufficient clearance for a screw 16 fed through the tube 180. Where the vertical slot 192 confronts the tubular nosepiece 100 when the tubular element 120 is disposed at its uppermost position relative to the tubular nosepiece 100, the tubular nosepiece 100 is provided with a narrow, vertical slot 194 having an enlarged upper end 196 and providing sufficient clearance for a screw 16 fed through the tube 180 when the tubular element 120 is at such position, so long as the head of the screw 16 is upward as the screw 16 is fed through the tube 180. The enlarged upper end 196 of the slot 194 provides sufficient clearance for the head and integral washer of the screw 16 whereas the remaining portions of the slot 194 provide sufficient clearance only for the threaded shank of the screw 16. The slide 186 has, on each side, camming surfaces 198 (see FIG. 6) which cooperate with the integral washer of the screw 16 so as to deflect the head and integral washer of the screw 16 through the slot 192 and into the enlarged upper end 196 of the slot 194. FIG. 6 shows, in phantom lines, a screw 16 after the screw 16 has passed through the slots 192, 194. When the tubular element 120 is not at its uppermost position relative to the tubular nosepiece 100, the vertical slot 192 does not confront the vertical slot 194, and a screw 16 disposed at or within the vertical slot 192 cannot enter the vertical slot 194.

As described so far, except for the welded connection of the tubular nosepiece 100 to the bight of the bracket 40, and except for certain features to be later described, the tubular nosepiece 100, the tubular element 120, the tubular element 130, the screw gun 160, the feed tube 180, and associated components described above are similar to similarly functioning components of stand-up screw guns sold heretofore by ITW-Buildex (Illinois Tool Works Inc.), Itasca, Ill., under its ACCUDRIVE XL trademark. Since such components and their functions are known to those skilled in the art, further description of such components and their functions is not necessary, except as given below.

A crosspiece 200, which is welded to the slide 186 so as to extend over the side plates 32, 34, has a pivot pin 202 with an enlarged head at each end of the crosspiece 200. The pivot pins 202 extend beyond the plates 32, 34, upon each side of the base 30. A driving link 204 is connected at its upper end 206 to the pivot pin 202 at each end of the crosspiece 200. Each driving link 204 is connected at its lower end 208, by means of an integral pin 210, to a rear toggle link 212 at a location between the ends of the rear toggle link 212. The pivot pin 210 is closer to the upper end 214 of the rear toggle link 212 and further from its lower end 216. Each rear toggle link 212 is connected at its lower end 216, by means of a pivot pin 218 extending through a suitable aperture defined within a respective one of the side plates 32, 34, to a respective end of the brace 38. Each rear toggle link 212 is connected at its upper end 214, by means of an integral pin 220, to a front toggle link 222 at the upper end 224 of the front toggle link 222. Each front toggle link 222 is connected at its lower end 226, by means of a pivot pin 228, to the respective ends of a brace 230, which overlies a front end portion of the shuttle 70 and is assembled thereto by means of machine screws. Each pivot pin 228 extends through a longitudinal slot 232 defined within a respective one of the side plates 32, 34.

Thus, when the screw-feeding tube 180 and the screw-deflecting slide 186 (which is mounted rigidly thereto) are moved downwardly, the mechanical linkage comprising the driving links 204, the rear toggle links 212, and the front toggle links 222 cause the shuttle 70 to move toward the displaced position. The V-shaped cutout 58 defined within the rear wall 54 provides clearance for the crosspiece 200, which has a rearwardly extending portion, as shown. Also, when the tube 180 and the slide 186 are moved upwardly, the same linkage causes the shuttle 70 to move toward the normal position. Moreover, because the coiled spring 136 biases the tubular element 130 upwardly along the tubular element 120, the coiled spring 136 also biases the shuttle 70 toward the normal position.

The tubular element 130 is threaded at its lower end, as shown, where it is provided with a threaded collar 240 which can be manually rotated upon the lower end of the tubular element 130. An 0-ring 242 is mounted around the threaded collar 240 so as to bias a ball (not shown) into releasable holding engagement with a respective one of four axial grooves spaced regularly around the collar 240. The screw-feeding tube 180 is provided with a fixed stop 244, against which the threaded collar 240 bears when rotated downwardly upon the lower end of the tubular element 130. Rotation of the threaded collar 240 upon the tubular element 130, as limited by means of the fixed stop 244, adjusts the maximum downward extension of the driving bit 164.

Figure 18:
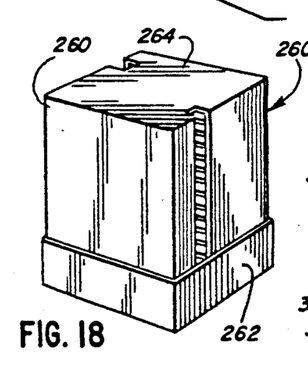
FIG. 18 is a perspective view of a stack of roofing washers within a container having a removable lower cover for use within the machine as shown in FIGS. 9 through 10.
Figures 19, 21, 22, 23:
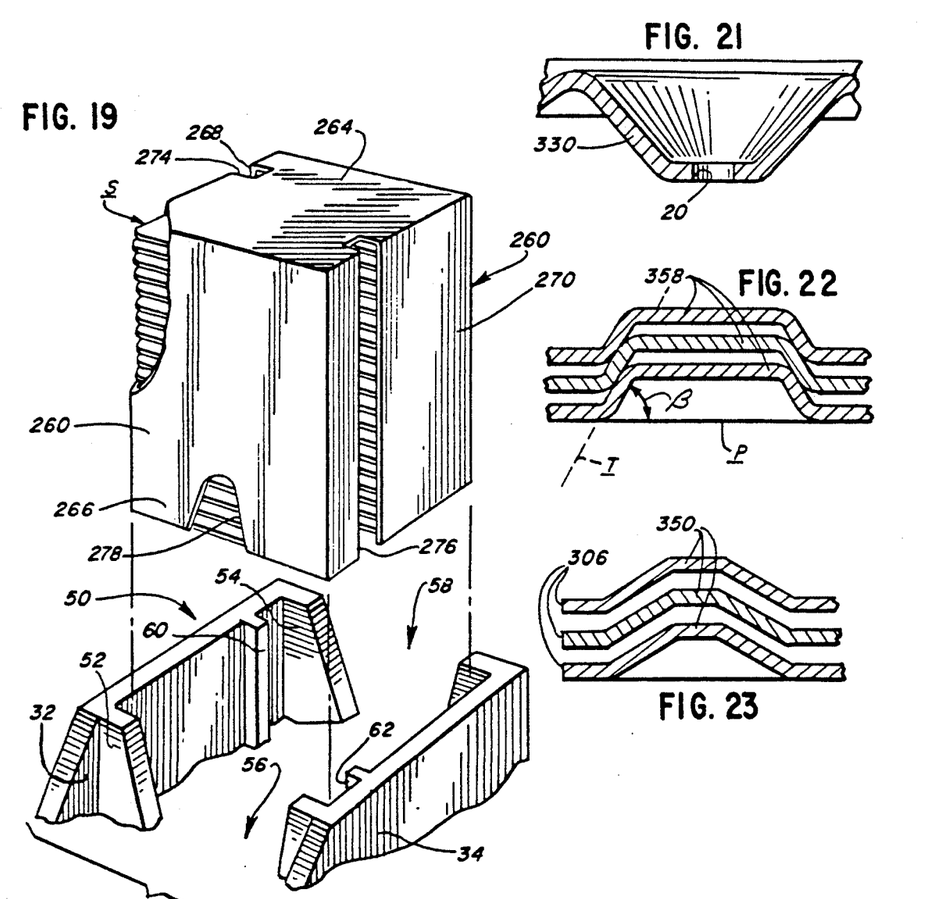
FIG. 19 is a greatly enlarged, partly fragmentary, exploded, perspective view of the stack of roofing washers within the container.
FIGS. 21, 22, and 23 respectively are greatly enlarged, fragmentary, sectional views, as taken along lines 21—21, 22—22, and 23—23 respectively of FIG. 20 in directions indicated by means of the arrows.
Figure 20:
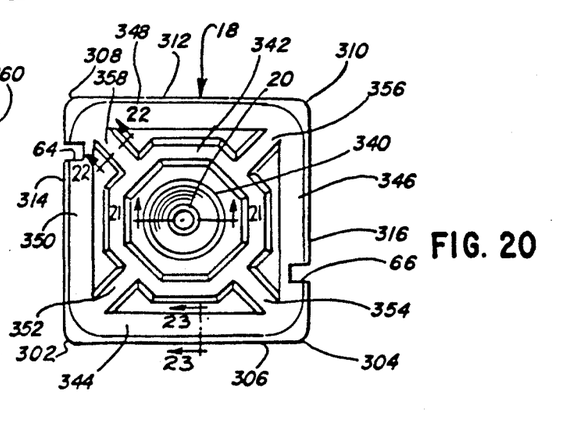
FIG. 20 is a top plan view of a preferred form of such a washer.

As shown in FIGS. 18 and 19, the stack S of washers 18 may be conveniently packaged within a novel container 260, which may be advantageously thermoformed from a suitable, opaque, polymeric material, such as, for example, poly(ethylene or terephthalate) or polypropylene, or which may be alternatively made from paperboard or card stock with glued flaps. A removable, lower cover 262 is provided, which may be similarly thermoformed or otherwise made, as from the material of the container 260. As shown in FIG. 19, the stack S may be conveniently left within the container 260, after the cover 262 has been removed, when the stack S is inserted manually into the washer-receiving chute 50, which provides sufficient clearance for such a container having thin walls.

The container 260 has a top wall 264, a rear wall, which is hidden in FIGS. 18 and 19, a front wall 266, a side wall 268, which is shown fragmentarily in FIGS. 18 and 19, and a side wall 270. When the stack S is left in the container 260, the container 260 rests upon edge portions of the shuttle 70, so as to span the recessed rear portion of the shuttle 70, when the shuttle 70 is disposed at the displaced position. Otherwise, as shown, the container 260 is seated across the shuttle 70.

The top wall 264 and the side wall 268 are provided with a vertical slot 274, which is disposed so as to expose the notches 64 of the washers 18 within the stack S. The top wall 264 and the side wall 270 have a vertical slot 276, which is disposed so as to expose the notches 66 of the washers 18 within the stack S. Thus, the slot 274 permits the rib 60 to fit through the slot 274 into the notches 64 of the washers 18 within the stack S and the slot 276 permits the rib 62 to fit through the slot 276 into the notches 66 of the washers 18 within the stack S so as to thereby restrain the washers 18 within the stack S against cascading from the stack S if the machine 10 including the chute 50 is tipped whereby the stack S is likewise tipped.

The front wall 266 has an inverted, V-shaped cutout 278, which facilitates handling the stack S within the container 260, after the cover 262 has been removed, as when the stack S is to be manually inserted into the chute 50. Similarly, the front wall may have an inverted, V-shaped cutout (not shown) at its lower edge.

As shown in a preferred embodiment in FIGS. 20 through 23, each washer 18 is substantially square, except for rounded corners 302, 304, at its leading edge 306 and rounded corners 308, 310 at its trailing edge 312. Each washer 18 is provided, at one lateral edge 314, with a notch 64, which is spaced by means of a given distance from its trailing edge 312. Each washer 18 is provided, at one lateral edge 314, with a notch 64, which is spaced by means of a given distance from its trailing edge 312. Each washer 18 is provided, at its opposite lateral edge 316, with a notch 66, which is spaced by means of a greater distance from the trailing edge 312 than from its leading edge 306. The notches 66, 64, adapt each washer 18 to fit into the chute 50 with the rib 60 fitting into the notch 64 and with the rib 62 fitting into the notch 66. When the stack S of such washers 18 is fitted into the chute 50, either with the container 260 after the cover 262 has been removed or apart from any container, the respective ribs, by fitting into the respective notches defined within the washers 18 disposed within the stack S, restrain the washers 18 within the stack S against cascading from the stack S if the machine 10 including the chute 50 is tipped whereby the stack S is likewise tipped. There is no need for an overlying weight to restrain the washers 18 within the stack S from doing so.

Generally, each washer 18 is made from a steel blank by embossing such blank as in a mechanical or hydraulic press (not shown) employing matched dies and a lubricating medium, so as to have positive relief and planar areas upon its upper face, so as to have negative relief and planar areas upon its lower face, and so as to have a countersunk portion 330 which includes the central aperture 20 of such washer 18. Positive relief upon the upper face of such washer 18 provides camming surfaces 18a, 18b, as discussed above. The notches 64, 66, cause such washer 18 to be asymmetrically shaped, as the chute 50 is shaped, so as to thereby insure that the broad face having positive relief is the upper face with the countersunk portion 330 below the periphery of such washer 18. The ribs 60, 62, prevent such washer 18 from being inserted in an improper orientation into the chute 50.

As shown, each washer 18 is embossed with an ornamental and functional pattern of ribs including an annular rib 340 in a circular pattern around the countersunk portion 330, an annular rib 342 in an octagonal pattern around the annular rib 340, peripheral ribs 344, 346, 348, 350, in a square pattern along peripheral areas of such washer 18 and radial ribs 352, 354, 356, 358, along diagonal paths, between straight sections of the annular rib 342 and intersections formed by means of the peripheral ribs 344, 346, 348, 350. Such ribs, which strengthen and rigidify such washer 18, define positive relief and planar areas upon one broad face of such washer 18 and negative relief and planar areas upon the other face of such washer 18. Thus, within the stack S comprising a plurality of the washers 18, positive relief defined by means of such ribs upon each washer 18 nests into negative relief defined by means of such ribs upon an overlying washer within the stack and positive relief defined by means of an underlying washer within the stack S nests into negative relief defined by means of such ribs upon such washer 18.

The radial ribs 352, 354, 356, 358, are configured in cross-section so as to define at least three places, which are located where positive relief nests into negative relief, at which each washer 18 and like overlying and underlying washers within the stack S contact each other, and which define tangent planes T intersecting planes P defined by means of planar areas upon each of the upper and lower faces of such washer 18 at angles greater than 45° but less than 90°, and preferably 60°, as shown in FIG. 22, which shows several of the washers 18 from the stack S, and in which such an angle is indicated by means of the Greek letter beta. Consequently, each washer 18 and like overlying and underlying washers 18 within the stack S are spaced from each other around their entire peripheries and between planar areas upon such washers 18, as shown in FIG. 23, in which the leading edges 306 of several of the washers 18 from the stack S are shown. Because they are spaced from each other around their entire peripheries and between planar areas thereof, such washers 18 have little tendency to adhere to each other when dispensed individually by means of the machine 10 even if coated partly or wholly with residue of a lubricating medium.

As a preliminary step, operation of the machine 10 requires the stack S of roofing washers 18, either within the container 260 after the cover 262 has been removed or apart from any container, to be manually inserted into the washer-receiving chute 50 with the rib 60 fitting into the notches 64 of the stacked washers 18 and with the rib 62 fitting into the notches 66 of the stacked washers 18.

Thereupon, after a screw 16 has been fed manually through the screw-feeding tube 180, by being dropped into the tube 180, so as to be temporarily held by means of the jaws 104 at the lower end 102 of the tubular nosepiece 100, the screw gun 160 is pressed downwardly so as to cause the shuttle 70 to move from the normal position to the displaced position, at which a single washer 18' from the stack S, namely the lowermost washer from the stack S, is received within the recessed rear portion of the shuttle 70. When the screw gun 160 is then released, the coiled spring 136 returns the tubular element 130 upwardly along the tubular element 120, whereupon the shuttle 70 returns to the normal position and displaces the single washer 18' from the stack S to the separated position, at which the central aperture 20 of the single washer 18' is aligned vertically and axially with the central aperture 44 of the bight 42 of the bracket 40, with the tubular nosepiece 100 having the jaws 104 at its integral collar 102, and with the driver 162 and the driving bit 164.

Next, after the machine has been positioned appropriately upon the sheet 12 of roofing material, after the stack S of roofing washers 18 has been inserted within the chute 50, the screw gun 160 is again pressed downwardly, whereupon the shuttle 70 is displaced from the normal position to the displaced position and the single washer 18' is released and drops onto the sheet 12 of roofing material, and whereupon further, the driving bit 164 cams the jaws 104 outwardly and the head of the screw 16 becomes engaged within the socket 166 of the driving bit 164. The screw gun 160 can then be actuated with downward pressure exerted upon the screw gun 160 so as to drive the screw 16 through the central aperture 20 of the washer 18' which has dropped onto the sheet 12 of roofing material, through the sheet 12 of roofing material, and into the underlayment 14, until the integral washer of the screw 16 bears against such washer 18'.

The machine 10 may then be moved to another location upon the sheet 12 of roofing material where the machine 10 can again be operated in a like manner.

Various modifications may be made with respect to the machine 10, the washers 18, or both without departing from the scope and spirit of this invention, which is defined by means of the appended claims. It is therefore to be understood that within the scope of the appended claims, the present invention may be practiced otherwise than as specifically described herein.

What is claimed:

1. A washer-dispensing and fastener-driving machine for use with stackable roofing washers having central apertures and for use in fastening roofing material, such as a blanket of roofing insulation or a roofing membrane, to an underlayment, such as a wooden roof or a corrugated metal roof, by fasteners having heads, such as screws, with one such washer being interposed between the head of each such fastener and such material, said machine comprising:

(a) a base;

(b) a chute, which is supported by said base, and which is adapted to contain a stack of roofing washers to be individually dispensed by said machine;

(c) a shuttle, which is mounted upon said base for horizontal movement between a normal position and a displaced position, which is adapted to engage a single washer from said stack of roofing washers disposed within said chute when said shuttle is at said displaced position, which is adapted to displace said single washer from said stack of washers to a separated position by positive engagement of said shuttle with said single washer as said shuttle moves from said displaced position to said normal position, and which is adapted to release said single washer at said separated position as said shuttle next moves from said normal position to said displaced position;

(d) washer-restraining means for restraining the washer overlying said single washer within said stack against being displaced from said stack along with said single washer as said shuttle moves from said displaced position to said normal position and for restraining said single washer from being displaced from said separated position as said shuttle next moves from said normal position to said displaced position after having displaced said single washer from said stack to said separated position;

(e) shuttle-biasing means for biasing said shuttle to said normal position but permitting said shuttle to be forcibly moved from said normal position to said displaced position;

(f) shuttle-moving means, arranged to be operated-actuated and to be normally deactuated, for moving said shuttle forcibly from said normal position to said displaced position when actuated and for moving said shuttle as biased by said shuttle-biasing means from said displaced position to said normal position when deactuated; and (g) fastener-driving means adapted to be operated-actuated for driving a fastener through said central aperture of said single washer while said single washer is disposed at said separated position and said shuttle is disposed at said displaced position.

2. The washer-dispensing and fastener-driving machine of claim 1 for use with stackable roofing washers which are embossed so as to form camming surfaces upon peripheral areas of one broad face of each one of said washers and which are stacked so that said broad face formed with said camming surfaces upon each one of said washers is an upper surface of each one of said washers, wherein said washer-restraining means comprises a gate, which is mounted upon said base for vertical movement toward and away from a lowermost position, which is biased toward said lowermost position, which in said lowermost position provides sufficient clearance for all or substantially all of said single washer, being displaced by said shuttle from said stack to said separated position, to pass beneath said gate but insufficient clearance for any overlying washer within said stack to also pass beneath said gate along with said single washer, which is cammed upwardly by means of said camming surfaces upon said upper surface of said single washer as said single washer is displaced by said shuttle so as to allow said single washer to pass beneath said gate, and which engages said camming surfaces upon said upper surface of said single washer so as to restrain said single washer against being displaced from said separated position as said shuttle next moves from said normal position to said displaced position.

3. The washer-dispensing and fastener-driving machine as set forth in claim 2, wherein:

one wall of said chute has a vertically extending opening defined therein;

said gate comprises an upwardly extending tongue portion reciprocatingly disposed within said opening of said chute wall; and spring means are disposed within said opening of said chute wall and interposed between a portion of said chute wall defining an upper extent of said chute wall opening and said gate so as to bias said gate downwardly toward said lowermost position.

4. The washer-dispensing and fastener-driving machine of claim 1 for use with stackable roofing washers which are embossed so as to form camming surfaces upon one broad face of each one of said washers, which are stacked so that said broad face formed with said camming surfaces upon each one of said washers is an upper surface of said washer, and which are provided at the periphery of each one of said washers with at least one notch, wherein said chute is provided with a rib, which is disposable within said notches of each one of said washers and of like overlying and underlying washers within said stack disposed within said chute so as to restrain said washers against cascading from said stack when said chute is tipped whereby said stack is likewise tipped.

5. The washer-dispensing and fastener-driving machine of claim 4 wherein:

said washer-restraining means comprises a gate which is mounted upon said base for vertical movement toward and away from a lowermost position, which is biased toward said lowermost position, which in said lowermost position provides sufficient clearance for portions of said shuttle and all or substantially all of said single washer, being displaced by means of said shuttle from said stack to said separated position, to pass beneath said gate but insufficient clearance for any overlying washer within said stack to also pass beneath said gate along with said single washer, which is cammed upwardly by means of said camming surfaces upon said upper surface of said single washer as said single washer is displaced by means of said shuttle so as to pass beneath said gate, and which engages said camming surfaces upon said upper surface of said single washer so as to restrain said single washer against being displaced from said separated position as said shuttle next moves from said normal position to said displaced position.

6. The washer-dispensing and fastener-driving machine of claim 5, wherein:

said rib is located such that said chute is shaped asymmetrically where said chute surrounds each one of said washers so as to insure that said camming surfaces formed upon said one broad face of each one of said washers face upwardly when each one of said washers and like overlying and underlying washers within said stack are disposed within said chute.

7. The washer-dispensing and fastener-driving machine of claim 4, wherein:

said rib is located such that said chute is shaped asymmetrically where said chute surrounds each one of said washers so as to insure that said camming surfaces formed upon said one broad face of each one of said washers face upwardly when each one of said washers and like overlying and underlying washers within said stack are disposed within said chute.

8. The washer-dispensing and fastener-driving machine of claim 4 for use with stackable roofing washers being spaced from each other around their entire peripheries when stacked, being embossed so as to form camming surfaces upon one broad face of each one of said washers, being stacked so that said one broad face formed with said camming surfaces upon each one of said washers faces upwardly, being provided at the periphery of each one of said washers with at least one notch, and being packaged within a container having lateral walls, which have at least one slot exposing said notches of said washers within said container, wherein said chute is provided with a rib, which extends through said slot and into said notches of each one of said washers and of like overlying and underlying washers within said stack within said container disposed within said chute so as to restrain each one of said washers and like overlying and underlying washers against cascading from said stack when said chute is tipped whereby said stack is also tipped.

9. The washer-dispensing and fastener-driving machine of claim 7 for use with stackable roofing washers embossed so as to form camming surfaces upon one broad face of each one of said washers, stacked so that said one broad face formed with said camming surfaces upon each one of said washers is an upper surface of said washer, and provided at spaced locations upon the periphery of each one of said washers with two notches, wherein said chute is provided with two spaced ribs which are disposable within said notches of each one of said washers and of like overlying and underlying washers within said stack disposed within said chute so as to restrain said washers against cascading said stack when said chute is tipped whereby said stack is also tipped.

10. The washer-dispensing and fastener-driving machine of claim 9, wherein:
said washer-restraining means comprises a gate which is mounted upon said base for movement toward and away from a restraining position, which is biased toward said restraining position, which at said restraining position provides sufficient clearance for portions of said shuttle and all or substantially all of said single washer, being displaced by means of said shuttle from said stack to said separated position, to pass beneath said gate but insufficient clearance for any overlying washer within said stack to also pass beneath said gate along with said single washer, which is cammed upwardly by means of said camming surfaces upon said upper surface of said single washer as said single washer is displaced by means of said shuttle so as to pass beneath said gate, and which engages said camming surfaces upon said upper surface of said single washer so as to restrain said single washer from being displaced from said separated position by frictional engagement of said shuttle with said single washer as said shuttle moves from said normal position to said displaced position after all or substantially all of said single washer has passed beneath said gate.

11. The washer-dispensing and fastener driving machine of claim 10, wherein:
said ribs are located such that said chute is shaped asymmetrically where said chute surrounds each one of said washers so as to insure that said camming surfaces formed upon said one broad face of each one of said washers face upwardly when each one of said washers and like overlying and underlying washers within said stack are disposed within said chute.

12. The washer-dispensing and fastener-driving machine of claim 9, wherein:
said ribs are located such that said chute is shaped asymmetrically where said chute surrounds each one of said washers so as to insure that said camming surfaces formed upon said one broad face of each one of said washers face upwardly when each one of said washers and like overlying and underlying washers within said stack are disposed within said chute.

13. The washer-dispensing and fastener-driving machine of claim 9 for use with stackable roofing washers being spaced from each other around their entire peripheries when stacked, being embossed so as to form camming surfaces upon one broad face of each one of said washers, being stacked so that said one broad face formed with said camming surfaces upon each one of said washers faces upwardly, being provided at spaced locations upon the periphery of each one of said washers with two notches, and being packaged within a container having lateral walls, which have spaced slots exposing said notches of said washers within said container, said chute is provided with spaced ribs which extend through said slots and into said notches of each one of said washers and of like overlying and underlying washers within said stack formed within said container disposed within said chute so as to restrain each one of said washers and like overlying and underlying washers against cascading from said stack when said chute is tipped whereby said stack is also tipped.

14. The washer-dispensing and fastener-driving machine as set forth in claim 1, wherein:
said shuttle comprises a substantially flat planar plate; and
said base includes groove means defined therein for accommodating laterally spaced side edge portions of said shuttle plate so as to permit said shuttle plate to be moved in a reciprocating manner between said normal and displaced positions.

15. The washer-dispensing and fastener-driving machine as set forth in claim 14, further comprising:
recess means defined within said shuttle plate for housing said single washer as said single washer is being moved from said displaced position toward said normal position.

* * * * *